(12) United States Patent
Harel et al.

(10) Patent No.: US 7,515,605 B2
(45) Date of Patent: Apr. 7, 2009

(54) EFFICIENT TRANSPORT OF TDM SERVICES OVER PACKET NETWORKS

(75) Inventors: Rafi Harel, Beit Hashmonia (IL); David Zelig, Givataim (IL); Leon Bruckman, Petah Tikva (IL); Nitzan Kappel, Zoran (IL)

(73) Assignee: Corrigent Systems Ltd, Tel Aviv (IL)

( * ) Notice: Subject to any disclaimer, the term of this patent is extended or adjusted under 35 U.S.C. 154(b) by 1424 days.

(21) Appl. No.: 10/396,008

(22) Filed: Mar. 24, 2003

(65) Prior Publication Data

US 2004/0190548 A1 Sep. 30, 2004

(51) Int. Cl.
*H04J 3/16* (2006.01)
(52) U.S. Cl. .................. 370/466; 370/352; 370/474
(58) Field of Classification Search .......... 370/465, 370/466, 469, 470, 472, 474, 476, 498, 503, 370/352, 353, 354, 355, 356, 400, 401
See application file for complete search history.

(56) References Cited

U.S. PATENT DOCUMENTS

| | | | |
|---|---|---|---|
| 5,303,234 A | 4/1994 | Kou | |
| 5,600,316 A | 2/1997 | Moll | |
| 6,097,702 A | 8/2000 | Miller et al. | |
| 6,275,493 B1 | 8/2001 | Morris et al. | |
| 6,381,215 B1 | 4/2002 | Hamilton et al. | |
| 6,408,001 B1 | 6/2002 | Chuah et al. | |
| 6,507,577 B1 | 1/2003 | Mauger et al. | |
| 6,522,627 B1 | 2/2003 | Mauger | |
| 6,539,011 B1 * | 3/2003 | Keenan et al. | 370/352 |
| 6,563,793 B1 | 5/2003 | Golden et al. | |
| 6,604,136 B1 | 8/2003 | Chang et al. | |
| 6,633,566 B1 | 10/2003 | Pierson, Jr. | |
| 6,760,775 B1 | 7/2004 | Anerousis et al. | |
| 6,778,494 B1 | 8/2004 | Mauger | |
| 6,778,496 B1 | 8/2004 | Meempat et al. | |
| 6,831,932 B1 | 12/2004 | Boyle et al. | |
| 6,886,043 B1 | 4/2005 | Mauger et al. | |
| 6,925,054 B1 | 8/2005 | Atterton et al. | |
| 6,963,561 B1 * | 11/2005 | Lahat | 370/356 |
| 6,985,447 B2 | 1/2006 | Gibson et al. | |
| 6,990,121 B1 * | 1/2006 | Stiles et al. | 370/498 |
| 7,006,497 B2 * | 2/2006 | Dove et al. | 370/390 |
| 7,006,525 B1 * | 2/2006 | Jha | 370/466 |
| 7,194,001 B2 * | 3/2007 | Leatherbury et al. | 370/395.64 |
| 7,289,538 B1 * | 10/2007 | Paradise et al. | 370/497 |

(Continued)

OTHER PUBLICATIONS

Office Action dated Mar. 8, 2006 for U.S. Appl. No. 09/978,342.

(Continued)

*Primary Examiner*—Chi H. Pham
*Assistant Examiner*—Kevin Mew
(74) *Attorney, Agent, or Firm*—Townsend and Townsend and Crew LLP

(57) ABSTRACT

A method for data communications includes receiving a time-division-multiplexed (TDM) input signal carrying a payload comprising data and determining whether the data comprise synchronous or non-synchronous data. A first encapsulation scheme is selected if the data comprise synchronous data, and a second encapsulation scheme is selected if the data comprise non-synchronous data. The data are encapsulated for transmission over a packet-switched network in accordance with the selected encapsulation scheme.

11 Claims, 9 Drawing Sheets

U.S. PATENT DOCUMENTS

| | | | |
|---|---|---|---|
| 2001/0033575 A1 | 10/2001 | Shimamura et al. | |
| 2001/0047460 A1 | 11/2001 | Kobayashi et al. | |
| 2002/0015411 A1 | 2/2002 | Katoaka et al. | |
| 2002/0018482 A1 | 2/2002 | Gotzer | |
| 2002/0085563 A1* | 7/2002 | Mesh et al. | 370/393 |
| 2002/0085567 A1* | 7/2002 | Ku et al. | 370/396 |
| 2002/0093949 A1 | 7/2002 | Yasue et al. | |
| 2002/0176450 A1 | 11/2002 | Kong et al. | |
| 2003/0026298 A1 | 2/2003 | Bisson et al. | |
| 2003/0036408 A1* | 2/2003 | Johanssoon et al. | 455/560 |
| 2003/0043826 A1 | 3/2003 | Charzinski et al. | |
| 2003/0061338 A1 | 3/2003 | Stelliga | |
| 2003/0137937 A1 | 7/2003 | Tsukishima et al. | |
| 2004/0008702 A1 | 1/2004 | Someya et al. | |
| 2004/0101303 A1 | 5/2004 | Williams | |
| 2005/0135436 A1 | 6/2005 | Nigam et al. | |
| 2005/0271059 A1* | 12/2005 | Young et al. | 370/389 |
| 2006/0092927 A1* | 5/2006 | Li et al. | 370/352 |
| 2006/0262774 A1* | 11/2006 | Moldestad et al. | 370/352 |
| 2007/0115825 A1* | 5/2007 | Roberts | 370/235 |

OTHER PUBLICATIONS

Office Action dated Mar. 15, 2006 for U.S. Appl. No. 09/935,970.

U.S. Appl. No. 09/978,342, filed Oct. 17, 2001, Zelig.

Office Action dated Aug. 10, 2006 for U.S. Appl. No. 09/935,970.

Rosen et al., RFC 3031 of the IETF, entitled: "Multiprotocol Label Switching Architecture", Jan. 2001. (Available at www.ietf.org/rfc.html).

Martini et al., in an IETF Draft Entitled: "Encapsulation Methods for transport of layer 2 Frames over MPLS", May 2001. (Available at: search.ietf.org/internet-drafts/draft-martini-l2circuit-encap-mpls-02.txt.).

Martini et al., Internet Draft, entitled: "Transport of Layer 2 Frames over MPLS", May 2001. (Available at: serach.ietf.org/internet-drafts/draft-martini-l2circuit-mpls-06.txt.).

Malis, et al., in an IETF draft entitled: "SONET/SDH Circuit emulation Service Over MPLS (CEM) Encapsulation", Apr. 2001. (Available at: search.ietf.org/internet-drafts/draft-malis-sonet-ces-mpls-04.txt.).

Walter Goralski, "SONET A Guide to Synchronous Optical Network", McGraw-Hill, 1997.

"Synchronous Optical Network (SONET) Transport Systems: Common Generic Criteria", Telcordia Technologies, Piscataway, New Jersey, publication GR-253-CORE< Sep. 2000.

ITU-T, Series I: Integrated Services Digital Network, ITU-T Recommendation I.432.1, 1999.

"Network to customer Installation-DS3 Metallic Interface Specification", ANSI, TI.404-1994.

* cited by examiner

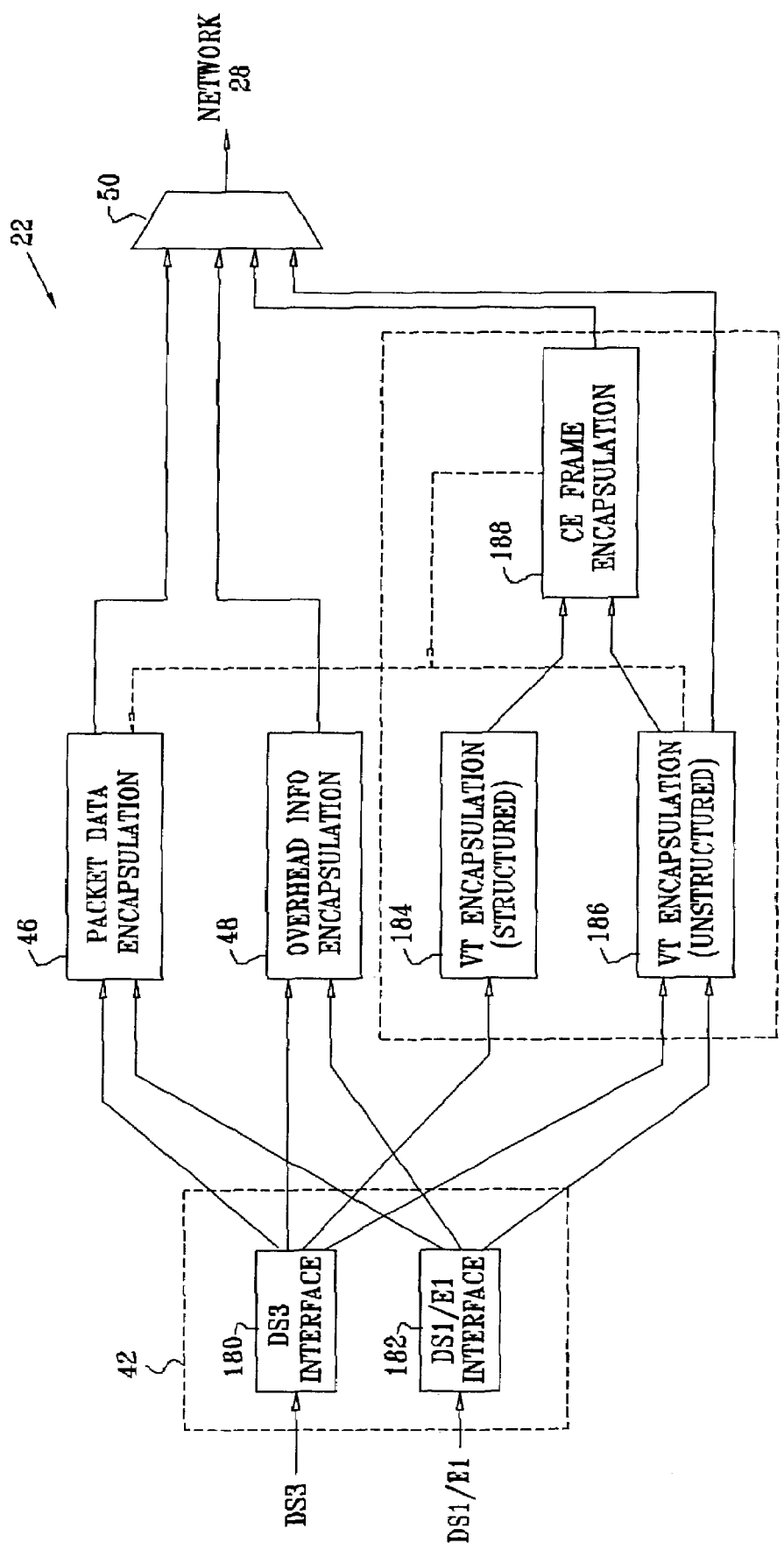

EFFICIENT TRANSPORT OF TDM SERVICES OVER PACKET NETWORKS

FIELD OF THE INVENTION

The present invention relates generally to communication networks, and specifically to providing circuit emulation services over packet networks.

BACKGROUND OF THE INVENTION

The Synchronous Optical Network (SONET) is a group of standards that define a hierarchical set of transmission rates and transmission formats for carrying high-speed, time-domain-multiplexed (TDM) digital signals. SONET lines commonly serve as trunks for carrying traffic between circuits of the plesiochronous digital hierarchy (PDH) used in circuit-switched communication networks. SONET standards of relevance to the present patent application are described, for example, in *Synchronous Optical Network (SONET) Transport Systems: Common Generic Criteria* (Telcordia Technologies, Piscataway, N.J., publication GR-253-CORE, September, 2000), which is incorporated herein by reference. While the SONET standards have been adopted in North America, a parallel set of standards, known as Synchronous Digital Hierarchy (SDH), has been promulgated by the International Telecommunications Union (ITU), and is widely used in Europe. From the point of view of the present invention, these alternative standards are functionally interchangeable.

The lowest-rate link in the SONET hierarchy is the OC-1 level, which is capable of carrying 8000 STS-1 frames per second, at a line rate of 51.840 Mbps. A STS-1 frame contains 810 bytes of data, which are conventionally organized as a block of nine rows by 90 columns. The first three columns hold transport overhead (TOH), while the remaining 87 columns carry the information payload, referred to as the synchronous payload envelope (SPE). The SPE contains one column of payload overhead (POH) information, followed by 86 columns of user data. The POH can begin at any byte position within the SPE capacity of the payload portion of the STS-1 frame. As a result, the SPE typically overlaps from one frame to the next. The TOH of each frame contains three pointer bytes (H1, H2, H3), which are used to indicate where in each frame the POH begins and to compensate for timing variations between the user input lines and the SONET line on which the STS-1 frames are transmitted.

STS-1 frames can efficiently transport the DS-3 level of the PDH, which operates at 44.736 Mbps. The STS-1 frames themselves are not too much larger than DS-3 frames. Each DS-3 frame may carry multiple lower-rate PDH signals, such as DS-1 or E-1 signals. When PDH signals at rates below DS-3 are to be carried over SONET, the SPE of the STS-1 frame is divided into sections, known as virtual tributaries (VTs), each carrying its own sub-rate payload. The component low-rate signals are mapped to respective VTs, so that each STS-1 frame can aggregate sub-rate payloads from multiple low-rate links. Multiple STS-1 frames can be multiplexed (together with STS-Mc frames) into STS-N frames, for transmission on OC-N links at rates that are multiples of the basic 51.840 Mbps STS-1 rate.

For the purpose of VT mapping, each STS-1 frame is divided into seven virtual tributary groups (VTGs), each occupying 12 columns of the SPE. Within each VTG, four VT sizes are possible:

VT1.5—occupies three columns, each with sufficient bandwidth to transport a DS-1 signal at 1.544 Mbps (i.e., the signal carried on a T-1 line). One VTG can contain four VT1.5 sections.
VT2—four columns, bandwidth sufficient for an E-1 line.
VT3—six columns, bandwidth sufficient for DS-1C.
VT6—twelve columns, bandwidth sufficient for DS-2.

Mapping of the VTs to the columns of the SPE is specified in detail in the above-mentioned Telcordia publication GR-253-CORE, section 3.2.4. It is not necessary that all of the VTs in a STS-1 frame be used to carry lower-rate signals. Unequipped VT sections, i.e. sections that have no service to carry, in the SPE are simply filled with default (idle) data. In SDH systems, STM-1 frames are similarly divided into sub-rate payload sections of different sizes, referred to as TU-11, TU-12 and TU-2.

Although SONET and SDH were originally designed for carrying synchronous data, such as voice, legacy TDM networks and trunks are now commonly used for carrying non-synchronous packet data services, as well. Signal types and "containers" (such as the SPE) that were originally designed and optimized for voice services have been adapted for a variety of data transmission services, such as Frame Relay, Asynchronous Transfer Mode (ATM) and Internet Protocol (IP) Packet over SONET (PoS). The characteristics of voice and data traffic are very different, however: while voice services operate at low speed (8-64 kbps) with substantially constant data rate, data services have a very large bandwidth range (typically 64 kbps to more than 1 Gbps) and are characterized by large differences between peak and average data rates. When a TDM network is used to carry data services, the network operator must set aside sufficient bandwidth to handle the peak data rate contracted for by the user. Most of the time, this bandwidth is underutilized. The containers that are assigned to carry the user packet data are therefore filled up with idle bytes, which consume network bandwidth without carrying any useful information.

While the synchronous SONET and SDH networks have been adapted for carrying packet data, circuit emulation services (CES) are developing for transporting SONET and legacy PDH signals over packet networks, such as Internet Protocol (IP) networks. CES allows the network operator to maintain existing TDM service interfaces in a manner transparent to network users, even when the TDM data traffic travels through a core packet network. For example, the CES operator could continue to offer subscribers DS-1 point-to-point service, while within the core network, the DS-1 signals are carried as packets.

Malis et al. describe a protocol that can be used to carry SONET frames over packet network in an Internet Engineering Task Force (IETF) draft entitled, "SONET/SDH Circuit Emulation over Packet (CEP)" (draft-ietf-pwe3-sonet-00.txt, July, 2002), which is incorporated herein by reference. This document, along with other IETF drafts cited herein, is available at www.ietf.org. The CEP protocol described by Malis et al. provides a method for emulating the key elements of traditional SONET/SDH SPE services across a packet-switched network, without making any assumptions about the contents of the SPE. It is therefore applicable to emulation of SONET and SDH circuits carrying any type of payload.

According to the CEP protocol, a SONET OC-N signal is terminated at the packet network ingress node, and the SPE is broken into fragments of fixed length. A CEP header is prepended to each fragment. The resulting packet may optionally be encapsulated with a RTP header (as defined by IETF RFC 1889) for transmission over the packet network. At the egress node from the packet network, the CEP packet stream is buffered to absorb delay variations, and the data payload is converted back into a SONET TDM signal using the CEP header information. The CEP header includes, inter alia, a structure pointer, which indicates the beginning of the STS-1 POH within the CEP packet payload (or contains a default value if the packet does not contain the beginning of the POH). The CEP header also contains bits indicating adjustments of the TOH pointer, which are used to advance or delay the SPE at the egress node in order to preserve the SPE timing between the two circuit emulation endpoints. In addition, the CEP header includes a sequence number (used to correct packet misordering) and a D bit that is used to invoke a dynamic bandwidth allocation (DBA) mode. The DBA mode is used optionally to conserve bandwidth on the packet network by avoiding transmission of trivial SPEs during SONET circuit outages and other abnormal conditions.

SONET frames that are encapsulated in accordance with the CEP protocol may be transported over various types of packet networks. Malis et al. specifically describe the use of Multiprotocol Label Switching (MPLS) tunnels for this purpose. MPLS is described in detail by Rosen et al., in IETF Request for Comments (RFC) 3031, entitled "Multiprotocol Label Switching Architecture" (January, 2001), which is incorporated herein by reference. In conventional IP routing, each router along the path of a packet sent through the network analyzes the packet header and independently chooses the next hop for the packet by running a routing algorithm. In MPLS, however, each packet is assigned to a Forwarding Equivalence Class (FEC) when it enters the network, depending on its destination address. The packet receives a short, fixed-length label identifying the FEC to which it belongs. All packets in a given FEC are passed through the network over the same path by label-switching routers (LSRs). Unlike IP routers, LSRs simply use the packet label as an index to a look-up table, which specifies the next hop on the path for each FEC and the label that the LSR should attach to the packet for the next hop.

When IP packets are passed through a MPLS tunnel, the routing label is removed at the egress node, which then simply routes the packet over its next hop using the packet's IP header. There is no need for the label to tell the egress node what to do with the packet, since the existing IP header, which was applied to the packet before it entered the tunnel, provides all of the necessary information. When layer 2 packets, such as Ethernet frames or ATM cells, are sent through a MPLS tunnel, however, the standard layer 2 media access control (MAC) header that brought the packet to the ingress node does not contain all the information that the egress node requires for delivering the packet to its destination. There is thus a need for a label that tells the egress node how to treat the received packet. This need applies, as well, to CES packets, such as those created in accordance with the above-mentioned CEP protocol.

In response to this problem, Martini et al. have proposed to add a "pseudo wire" label (or PW label) to the stack of labels used in transporting layer 2 packets through MPLS tunnels. This proposal is described in detail in an IETF draft entitled "Transport of Layer 2 Frames over MPLS" (draft-ietf-pwe3-control-protocol-01.txt, November 2002), which is incorporated herein by reference. In accordance with the protocol proposed by Martini et al., before initiating the layer 2 service, a MPLS tunnel is established between the ingress and egress nodes. To set up the required PW label binding for the layer 2 service, the ingress node sends a signaling packet to the egress node carrying a PW type, a group ID and a PW ID. The PW type specifies the type of layer 2service to be carried between the tunnel endpoints, such as Frame Relay, ATM, Ethernet, High-level Data Link Control (HDLC), Point-to-Point Protocol (PPP) or CEP (referred to by Martini et al. as "CEM"). The group ID represents an administrative group of PWs, and is used for administrative operations on the group. The PW ID is used by the layer 2 service endpoints to associate the locally-configured service with the tunnel.

The protocol defined by Malis et al. specifies that when CEP packets are to be transported through MPLS tunnels, a MPLS label stack is pushed on top of each CEP packet. The MPLS label stack includes the PW label (referred to by Malis et al. as the "VC label") as the last label prior to the optional RTP header and the CEP header. The PW label is preceded by one or more MPLS tunnel labels, depending on how the CEP packets are to be transported through the packet network.

A number of methods have been suggested for compressing the contents of SONET frames that are to be transported over packet networks by CES. For example, compression methods for packetized SONET/SDH payloads are described by Cohen in PCT Patent Publication WO 02/095958 A2, whose disclosure is incorporated herein by reference. These methods use the C2 signal label byte in the SONET POH to choose a compression algorithm to be applied to the SONET SPE payload. For example, the C2 byte may be used to identify unequipped frames, asynchronous channels, and payloads containing virtual tributaries, HDLC frames or PPP frames. Cohen specifies compression methods that can be applied to these different payload types.

Further aspects of CES are described by Pate et al. in an IETF draft entitled, "TDM Service Specification for Pseudo-Wire Emulation Edge to Edge (PWE3)" (draft-ietf-pwe3-sonet-vt-00.txt, August, 2002), which is incorporated herein by reference. This draft provides, inter alia, bandwidth saving modes for packetizing SONET and SDH frames carrying tributaries or asynchronous signals.

SUMMARY OF THE INVENTION

Embodiments of the present invention provide methods and systems for transport of TDM signals over a packet network, based on adaptive encapsulation of the TDM signal payloads. An integrated transport device (ITD) receives input signals from one or more TDM sources, typically via SONET, SDH or PDH input lines, and chooses the encapsulation scheme to be applied to each signal depending on the type of data that it carries. TDM signals carrying synchronous data, such as voice, are encapsulated using a circuit emulation scheme that preserves timing of the payload, such as the CEP scheme proposed by Malis et al. TDM signals carrying packet data, on the other hand, are encapsulated using a scheme that conserves bandwidth, typically by suppressing idle bytes in the payload.

The ingress ITD transmits the packetized TDM signals over the packet network to an egress ITD, which de-encapsulates the data and reconstructs the TDM signals for transmission over a TDM output line. For TDM signals carrying synchronous data, the output signal payloads are synchronized with the input signal payloads that were encapsulated by the ingress ITD, as required for synchronous circuit emulation. On the other hand, for TDM signals carrying packet data, the output signal payloads generally need not be synchronized with the input packets. Therefore, while the egress ITD typically generates a TDM output frame for every input frame received by the ingress ITD, the packets contained in the frames may be rearranged arbitrarily. The egress ITD may add idle bytes as required to fill the output TDM frames that it generates.

Transport systems in accordance with embodiments of the present invention not only conserve bandwidth in circuit emulation over packet networks, but also permit the network operator to allocate the required bandwidth more efficiently. For example, packets created by the ingress ITD to encapsulate packet data may be assigned a lower service level than packets that encapsulate synchronous data. The packets encapsulating packet data may consequently be delayed during bursts of heavy network traffic, but such delays are normal and tolerated in most types of packet data service. The network operator may use this feature of the present invention to reduce the amount of bandwidth that must be allocated for circuit emulation, while still meeting requirements for timely delivery of synchronous data across the network.

In some embodiments of the present invention, the ITD is also configured to receive packet data inputs, such as Ethernet inputs, in addition to its TDM inputs. The packet inputs may be encapsulated by the ingress ITD and transported over the packet network in similar fashion to the TDM signal payloads that contain packet data. At the egress ITD, these packets are de-encapsulated and retransmitted over Ethernet or other packet data outputs.

There is therefore provided, in accordance with an embodiment of the present invention, a method for data communications, including:

receiving a time-division-multiplexed (TDM) input signal carrying a payload including data;

determining whether the data include synchronous or non-synchronous data; and selecting a first encapsulation scheme if the data include synchronous data, and a second encapsulation scheme if the data include non-synchronous data; and encapsulating the data for transmission over a packet-switched network in accordance with the selected encapsulation scheme.

Typically, the synchronous data include voice data, while the non-synchronous data include at least one data type selected from a group of data types consisting of Asynchronous Transfer Mode (ATM) cells, Internet Protocol (IP) packets, Frame Relay (FR) frames, High-level Data Link Control (HDLC) frames, Point-to-Point Protocol (PPP) frames, Ethernet frames and Generic Framing Procedure (GFP) frames.

Receiving the TDM input signal may include receiving at least one of a Synchronous Optical Network (SONET) signal and a Synchronous Digital Hierarchy (SDH) signal or receiving a signal belonging to a Plesiochronous Digital Hierarchy (PDH). In one embodiment, receiving the signal belonging to the PDH includes receiving a structured PDH signal, and encapsulating the data includes applying the selected encapsulation scheme responsively to a structure of the signal. In another embodiment, receiving the at least one of the SONET and the SDH signal includes receiving a structured SONET or SDH signal containing a signal belonging to a Plesiochronous Digital Hierarchy (PDH), and encapsulating the data includes recovering the PDH signal from the structured SONET or SDH signal, and encapsulating the data in the payload of the PDH signal.

Typically, the TDM signal is received from a TDM source in a circuit-switched network, and the method includes receiving a non-synchronous input signal including input packets from a packet source outside the circuit-switched network, and applying the second encapsulation scheme to encapsulate the input packets in output packets for transmission over the packet-switched network.

In one embodiment, encapsulating the data includes encapsulating the data in Internet Protocol (IP) packets.

Alternatively or additionally, encapsulating the data includes adding one or more labels to the data for transmission through a tunnel in the packet-switched network. The tunnel may be defined by Multi-Protocol Label Switching (MPLS) in the packet-switched network, and encapsulating the data may include encapsulating the data in one or more output packets, and prepending one or more Pseudo Wire (PW) labels to each of the output packets.

In an aspect of the present invention, encapsulating the data in accordance with the first encapsulation scheme includes breaking the data into fragments of fixed length and encapsulating the fragments in respective output packets which are transmitted over the network in approximate synchronization with the payload of the TDM input signal. In one embodiment, encapsulating the fragments in the respective output packets includes prepending a Circuit Emulation over Packet (CEP) header to each of the fragments.

In another aspect of the present invention, encapsulating the data in accordance with the second encapsulation scheme includes extracting overhead information from the TDM signal, and generating overhead packets in order to convey the overhead information over the packet-switched network separately from the data.

In an embodiment of the invention, encapsulating the data includes assigning first and second service levels, respectively, to the packets encapsulated in accordance with the first and second encapsulation schemes, such that the packets at the first service level are transmitted over the packet-switched network with a higher priority than the packets at the second service level.

In a further aspect of the invention, encapsulating the data in accordance with the second encapsulation scheme includes detecting idle data in the payload carried by the TDM input signal, and generating output packets to encapsulate the data while omitting from the output packets at least some of the idle data. Typically, detecting the idle data includes detecting one or more idle bytes between input packets carried by the TDM input signal or detecting one or more idle cells between input cells carried by the TDM input signal. Further typically, generating the output packets includes joining together at least first and second information-carrying sequences of the data from the TDM input signal so as to generate one of the output packets while eliminating all of the idle data intervening between the first and second information-carrying sequences. Alternatively, generating the output packets includes joining together at least first and second information-carrying sequences of the data from the TDM input signal so as to generate one of the output packets while eliminating all but a single unit of the idle data intervening between the first and second information-carrying sequences in the TDM input signal.

In an embodiment of the present invention, generating the output packets includes setting boundary points corresponding to frames of the data in the TDM input signal, and generating the output packets for transmission in approximate synchronization with the boundary points. Typically, setting the boundary points includes determining a maximal length of the data that is carried by the TDM signal between successive ones of the boundary points, and generating the output packets includes sending each one of the output packets at a time corresponding to one of the boundary points or when the data to be encapsulated in the one of the output packets has reached the maximal length.

Typically, the method includes transmitting the output packets over the network to a receiver and, at the receiver, mapping the data carried by each of the output packets to an output frame, for transmission in a TDM output signal. In an embodiment of the invention, mapping the data includes, when the data carried in one of the output packets is shorter than a length of the output frame, adding further idle data to the output frame following the data carried in the one of the output packets so as to complete the output frame.

Additionally or alternatively, receiving the TDM input signal includes receiving input frames of the data, and the method includes transmitting the encapsulated data in output packets over the network to a receiver and, at the receiver, mapping the data to output frames, for transmission in a TDM output signal, so as to provide a circuit emulation service.

There is also provided, in accordance with an embodiment of the present invention, a method for data communications, including:

receiving time-division-multiplexed (TDM) input signals including first input frames carrying a first payload including synchronous data and second input frames carrying a second payload including non-synchronous data;

encapsulating the synchronous and non-synchronous data in output packets having respective first and second service levels;

transmitting the output packets over a packet-switched network to a receiver, such that the packets at the first service level are transmitted over the packet-switched network with a higher priority than the packets at the second service level; and at the receiver, mapping the data to output frames, for transmission in one or more TDM output signals, so as to provide a circuit emulation service.

In an aspect of the present invention, encapsulating the non-synchronous data includes detecting idle data in the second input frames, and generating the output packets to encapsulate the non-synchronous data while omitting from the output packets at least some of the idle data. Typically, mapping the data includes adding further idle data to at least some of the output frames following the non-synchronous data so as to complete the output frames.

There is additionally provided, in accordance with an embodiment of the present invention, a method for data communications, including:

receiving a time-division-multiplexed (TDM) input signal carrying a payload including input packets;

detecting one or more idle bytes between the input packets in the payload; and encapsulating the payload in output packets for transmission over a packet-switched network while omitting from the output packets at least some of the idle bytes.

In an embodiment of the invention, generating the output packets includes:

setting boundary points corresponding to the input frames in the TDM input signal;

determining a maximal length of data that is contained in each of the input frames; and sending each one of the output packets at a time corresponding to one of the boundary points or when the data to be encapsulated in the one of the output packets has reached the maximal length.

There is further provided, in accordance with an embodiment of the present invention, apparatus for data communications, including:

an input interface, which is adapted to receive a time-division-multiplexed (TDM) input signal carrying a payload including synchronous or non-synchronous data; and processing circuitry, which is adapted to select a first encapsulation scheme if the data include synchronous data, and a second encapsulation scheme if the data include non-synchronous data, and to encapsulate the data for transmission over a packet-switched network in accordance with the selected encapsulation scheme.

Typically, the input interface includes a TDM interface, which is adapted to receive the TDM input signal a TDM source in a circuit-switched network, and wherein the apparatus includes a packet interface, which is adapted to receive a non-synchronous input signal including input packets from a packet source outside the circuit-switched network, and wherein the processing circuitry is adapted to apply the second encapsulation scheme to encapsulate the input packets in output packets for transmission over the packet-switched network.

Additionally or alternatively, the apparatus includes a network interface, which is adapted to transmit the output packets over the network, and further includes a receiver, which is adapted to receive the output packets from the network and to map the data carried by each of the output packets to an output frame, for transmission in a TDM output signal.

There is moreover provided, in accordance with an embodiment of the present invention, apparatus for data communications, including:

a packet data transmitter, which includes:

an input interface, which is adapted to receive time-division-multiplexed (TDM) input signals including first input frames carrying a first payload including synchronous data and second input frames carrying a second payload including non-synchronous data;

processing circuitry, which is adapted to encapsulate the synchronous and non-synchronous data in output packets having respective first and second service levels; and an output interface, which is adapted to transmit the output packets over a packet-switched network, such that the packets at the first service level are transmitted over the packet-switched network with a higher priority than the packets at the second service level; and a receiver, which is adapted to receive the output packets from the packet-switched network, and to map the data in the output packets to output frames, for transmission in one or more TDM output signals, so as to provide a circuit emulation service.

There is furthermore provided, in accordance with an embodiment of the present invention, apparatus for data communications, including:

an input interface, which is adapted to receive a time-division-multiplexed (TDM) input signal carrying a payload including input packets; and processing circuitry, which is adapted to detect one or more idle bytes between the input packets in the payload, and to encapsulate the payload in output packets for transmission over a packet-switched network while omitting from the output packets at least some of the idle bytes.

The present invention will be more fully understood from the following detailed description of the embodiments thereof, taken together with the drawings in which:

BRIEF DESCRIPTION OF THE DRAWINGS

FIG. 11 is a block diagram showing elements of an integrated transport device used in encapsulating PDH signals, in accordance with an embodiment of the present invention.

DETAILED DESCRIPTION OF EMBODIMENTS

Figure 1:
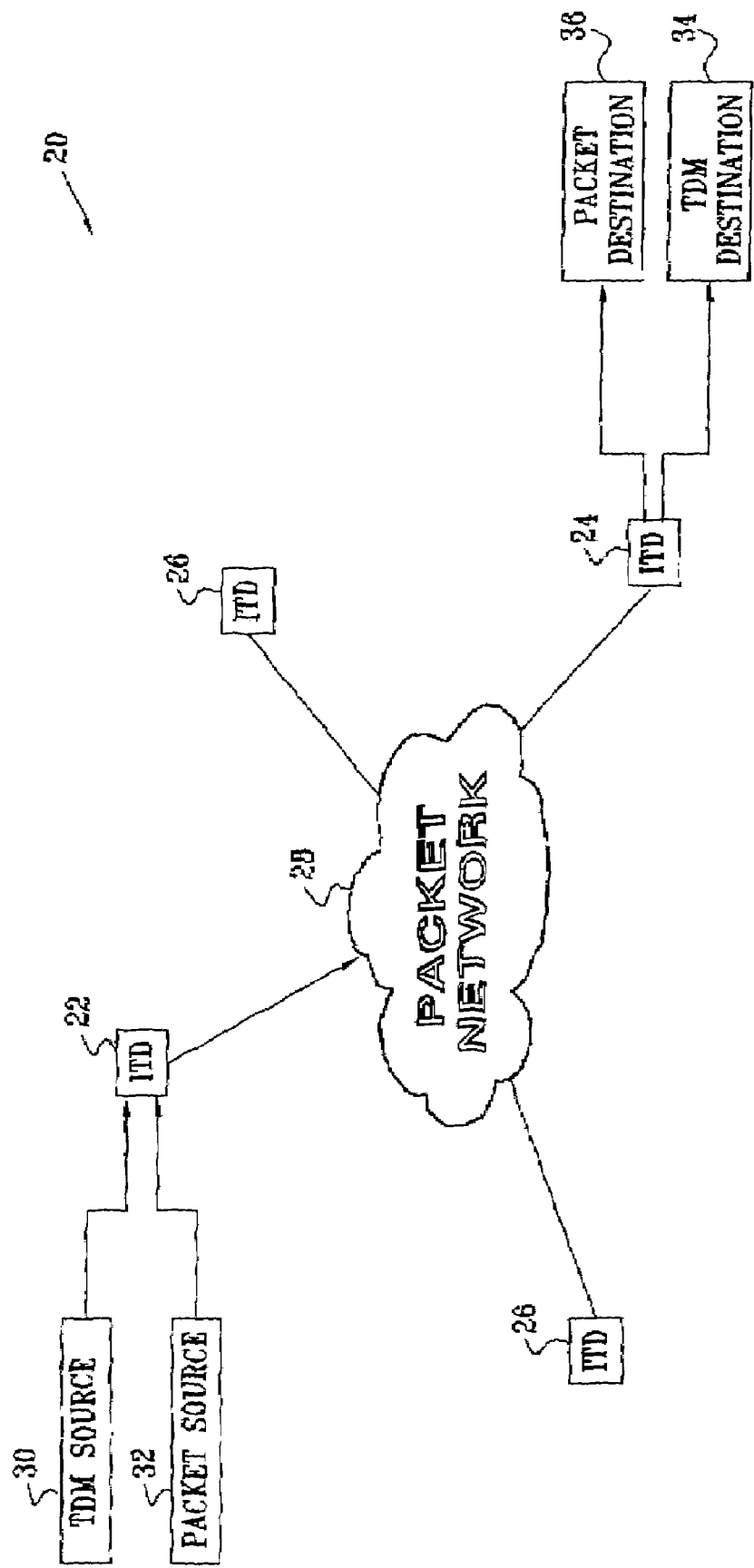
FIG. 1 is a block diagram that schematically illustrates a system for integrated data transport over a packet network, in accordance with an embodiment of the present invention.

FIG. 1 is a block diagram that schematically illustrates a system 20 for integrated data transport over a packet network 28, in accordance with an embodiment of the present invention. An ingress integrated transport device (ITD) 22 receives data inputs from one or more sources, typically multiple sources. These sources include a TDM source 30 and a packet source 32, for the purposes of the present example. The ingress ITD encapsulates the data from sources 30 and 32 into packets, and transmits the packets over network 28 to an egress ITD 24. In the embodiments described below, the packets are transmitted through network 28 via MPLS tunnels, as described in the Background of the Invention. The data packets may therefore be encapsulated in accordance with the scheme specified by Martini et al., in the above-mentioned Internet draft. Alternatively, the packets generated by ITD 22 may be transmitted through tunnels of other types, as are known in the art, or by conventional IP routing, using encapsulation schemes appropriate for these transport media.

Egress ITD 24 de-encapsulates the packets from network 28, and prepares the packet payloads for output to designated destinations. Typically, the payloads of data frames that were received from TDM source 30 are reframed by ITD 24 for output to a TDM destination 34. Packets that were received from packet source 32 are output by ITD 24 to a packet destination 36.

The embodiments of the present invention that are described hereinbelow relate to ITD 22 as the ingress ITD, and to ITD 24 as the egress ITD, for the sake of convenience and clarity of explanation. Typically, a given ITD may be configured to serve as both an ingress ITD and an egress ITD, so as to provide bidirectional service between TDM sources/destinations and packet sources/destinations. Furthermore, ITD 22 and ITD 24 may similarly be configured to transmit and receive encapsulated packets to and from other ITDs 26 on network 28. The ITDs typically comprise combinations of dedicated hardware switching and logic elements with software-driven microprocessors for control and computation functions. Details of the construction and programming of such ITDs will be apparent to those skilled in the art, based on the disclosure of the present patent application.

Figure 2:
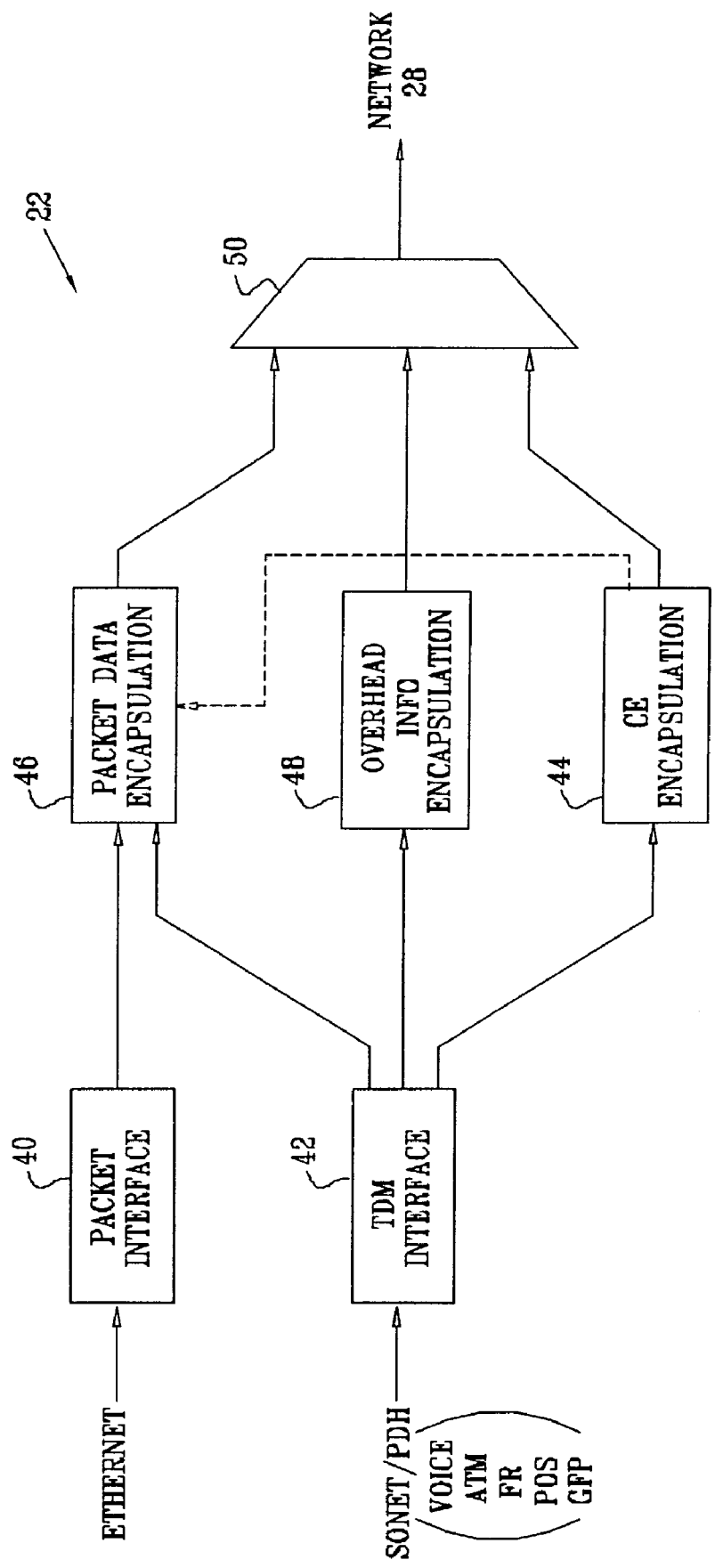
FIG. 2 is a block diagram that schematically illustrates an integrated transport device for encapsulating data to be transmitted over a packet network, in accordance with an embodiment of the present invention.

FIG. 2 is a block diagram that schematically shows details of ingress ITD 22, in accordance with an embodiment of the present invention. The division of ITD 22 into the blocks shown in the figure is presented here for the sake of conceptual clarity, and does not necessarily reflect the physical organization of hardware elements in the ITD. A packet interface 40, such as an Ethernet interface, receives input data packets from packet source 32. A TDM interface 42 receives data signals from TDM source 30. Assuming source 30 is a SONET line, for example, interface 42 may comprise an OC-1 or OC-N interface, and may comprise several such interfaces in parallel. The TDM interface thus receives a stream of STS-1 or STS-Nc frames, which may contain payload data of various types. At least some of the payload data typically comprises synchronous payloads, such as voice signals transmitted over DS1 lines of a PDH network. Other payload data received by TDM interface 42 may comprise packet data carried over TDM networks, such as Frame Relay, PPP, HDLC or Generic Framing Procedure (GFP) frames carried over DS1 lines, as well as ATM cells and IP packets transported over SONET lines in the TDM network. (GFP is described by Hernandez-Valencia in a draft specification of the American National Standards Institute (ANSI, New York, N.Y.), entitled "Generic Framing Procedure," document number T1X1.5/2000-024R2, March, 2001, which is incorporated herein by reference.)

For each TDM input signal that it receives, TDM interface 42 selects an appropriate encapsulation scheme to apply, depending on the type of the signal payload:

If the payload comprises synchronous data, such as voice data, interface 42 passes the data to a CE encapsulation module 44. This module encapsulates the payload data in such a way as to preserve synchronization of the data sent to egress ITD 24. In the present example, module 44 uses the encapsulation scheme specified by Malis et al., in the above-mentioned Internet draft, although other synchronization-preserving encapsulation schemes may be used, as well.

If the payload comprises non-synchronous data, such as IP packets, ATM cells, Frame Relay frames, PPP frames or HDLC frames (all of which are referred to generically herein as "packet data"), interface 42 passes the data to a packet data encapsulation module 46. This module also receives the packet data input to ITD 22 via packet interface 40. Module 46 encapsulates the data in a manner that is not dependent on the synchronization of the input data.

Module 46 treats each SONET STS frame sequence as a separate source of data. For example, if the input stream to ITD 22 is a SONET OC12 line, it may convey twelve multiplexed sequences of STS-1 SPEs, or four STS-3c SPEs, or a combination of STS-1 and STS-3c SPEs, or a single sequence of STS-12c SPEs. If the input stream is multiplexed, module 46 demultiplexes the data into its STS components and handles each component individually.

Module 46 may packetize the payload data in each TDM frame into a single packet or into a sequence of several packets, or it may alternatively generate large packets that encapsulate payload data from more than a single TDM frame. The payloads of the encapsulated packets may be arranged to correspond exactly to single IP packets or PPP/HDLC frames carried by the TDM signal, for example, or they may cross packet or frame boundaries. A number of alternative packetizing schemes are described hereinbelow by way of example. Preferably, module 46 reduces the data volume of the encapsulated packets by removing idle bytes, as is likewise described hereinbelow.

For MPLS transport, module 46 typically prepends labels to the encapsulated packets in accordance with the scheme defined by Martini et al., in their above-mentioned Internet draft. If the scheme of Malis et al. is applied by CE encapsulation module 44, the packets generated by this module also receive additional PW labels as specified by Martini et al. This additional encapsulation step is indicated by the dashed arrow in FIG. 2 from module 44 to module 46. In practice, if modules 44 and 46 are realized as separate physical units within ITD 22, module 44 may itself perform the required Martini encapsulation.

TDM signals, such as SONET frames, also carry overhead information, such as alarms, trace messages and signal labels, as are known in the art. CE encapsulation module 44 encapsulates the overhead information along with the payload data in the packets that it creates. On the other hand, packet data encapsulation module 46 encapsulates only the payload data, and is not concerned with the overhead information. Therefore, TDM interface 42 separates out the relevant overhead information from the TDM signals, and passes it to an overhead information encapsulation module 48. This module encapsulates the overhead information in overhead packets, which are then transmitted to a corresponding overhead de-encapsulation module in the egress ITD.

Module 48 may transmit the overhead information continually, or alternatively, only when required due to a change detected in the input signals to interface 42. Module 48 may use substantially any suitable encapsulation scheme for the overhead packets, including the scheme applied by module 46. Alternatively, a signaling protocol may be used to pass the overhead information between the ITDs. Signaling vehicles known in the art that may be used for this purpose include management frames, RSVP-TE or LDP signaling (using a special Type-Length-Value—TLV). Further alternatively, the overhead information may be incorporated in the data packets generated by module 46.

Typically, each of the TDM sources that is input to TDM interface 42 consistently carries either synchronous or non-synchronous (packet) data. Therefore, TDM interface 42 may be configured to associate each of its input ports with either CE encapsulation module 44 or packet data encapsulation module 46. Alternatively, the TDM interface may itself identify the type of signal received at each of its ports, and may thus associate the ports with encapsulation modules automatically. The default choice of encapsulation, when the signal type is not identified, is CE encapsulation module 44.

Encapsulated packets generated by modules 44, 46 and 48 are transmitted onto network 28 via a multiplexer 50. Packets generated by module 44 are typically transmitted by the multiplexer at the highest available service level on network 28, since these packets must reach egress ITD 24 within tight synchronization bounds. On the other hands, packets generated by module 46 may be transmitted by multiplexer 50 at a lower level of service, in order to conserve network bandwidth. These latter packets may be subject to statistical multiplexing, and may thus be delayed in arriving at their ultimate destination (and some of them may never arrive, if a "best effort" service level is used). Such delays are generally tolerated and expected in packet data services. Optionally, TDM interface 42 may flag the data payloads that it sends to module 46, in order to indicate different service levels at which the data should be sent.

Figure 3:
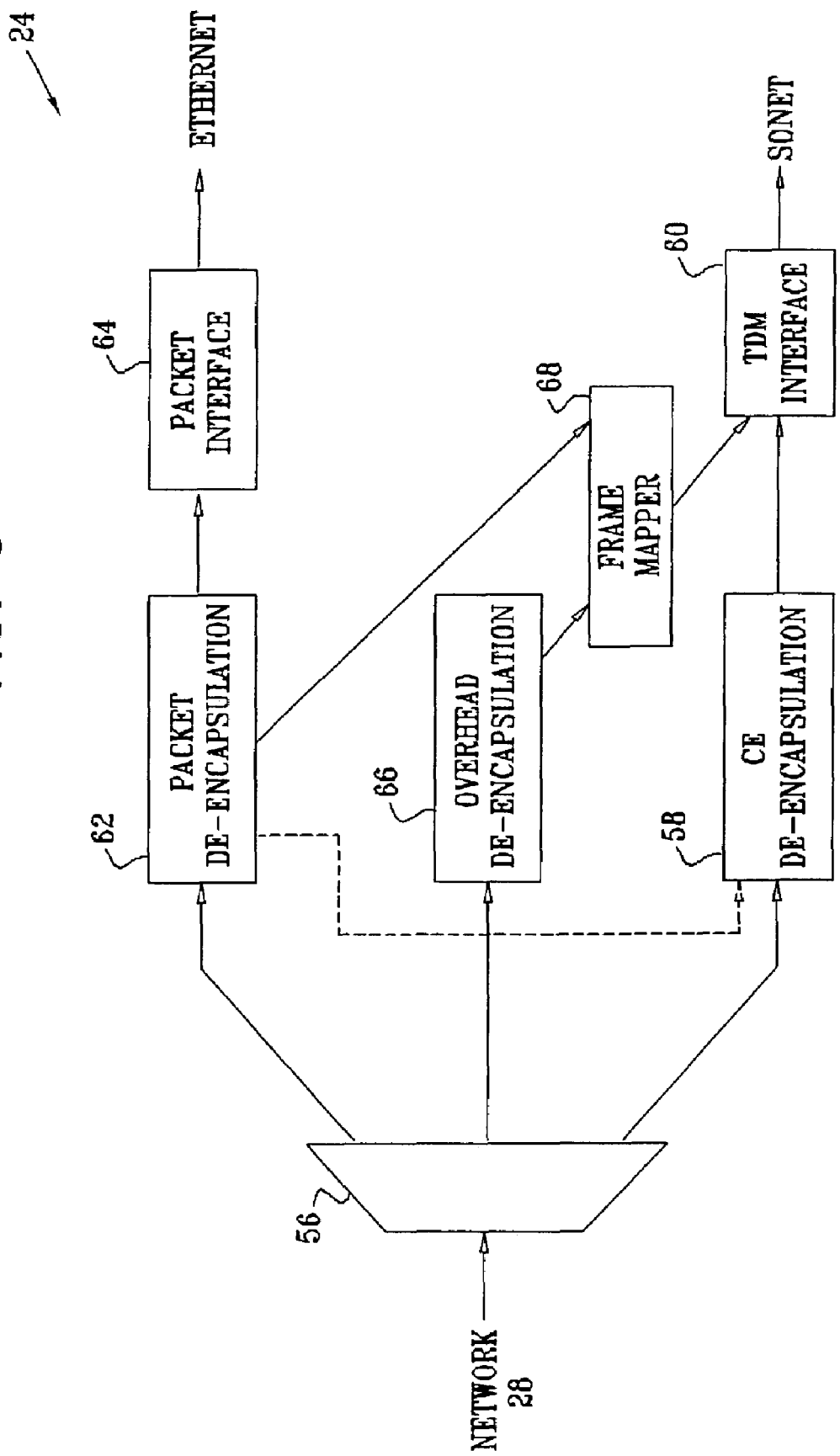
FIG. 3 is a block diagram that schematically illustrates an integrated transport device for de-encapsulating data received from a packet network, in accordance with an embodiment of the present invention.

FIG. 3 is a block diagram that schematically shows details of egress ITD 24, in accordance with an embodiment of the present invention. As in the case of FIG. 2, the division of ITD 24 into blocks is shown here for conceptual clarity, and does not necessarily reflect the actual hardware structure. A demultiplexer 56 receives encapsulated packets from network 28, and passes them to an appropriate de-encapsulation module based on the type of data the packets are carrying. The demultiplexer may identify the types of the packets, for example, by reading the "PW type" in the label stack at the head of each packet, as provided by Martini et al. Packets encapsulating synchronous data (such as CEP-type packets) are passed to a CE de-encapsulation module 58. This module stores the packets in a de-jitter buffer for as long as necessary to compensate for delay variations in network 28. It then reframes the packets as output SONET frames, typically as specified by Malis et al. These output frames are substantially identical to the corresponding input SONET frames that were received by ingress ITD 22. The output frames are then transmitted onto TDM output lines by a TDM interface 60.

Demultiplexer 56 passes frames containing non-synchronous data to a packet de-encapsulation module 62. In this module, too, the PW type label may be used to identify the payload type and the channel through which the data should be output from egress ITD 24. (Alternatively, when the encapsulation scheme of Martini et al. is used, all incoming encapsulated packets may be passed to module 62, which removes the group ID and PW ID labels, and performs the demultiplexing function itself based on these labels and the PW type label.) For signals received at ingress ITD 22 via packet interface 40, module 62 passes the corresponding de-encapsulated data to a packet interface 64, for transmission over an Ethernet link or other packet network connection.

On the other hand, when module 62 receives packet data that were carried by a TDM signal to interface 42 of ITD 22, it passes the corresponding de-encapsulated payload data to a frame mapper 68. The frame mapper maps the payload data into the payload of a TDM signal, such as a SPE for transmission in an outgoing SONET signal. Frame mapper 68 also sets overhead and alarm indications in the outgoing TDM signal, based on overhead information received in overhead packets from ITD 22, which is de-encapsulated by an overhead packet de-encapsulation module 66. As described below in greater detail, the locations of packets of data within the TDM payloads generated by frame mapper 68 may be different from the locations that these packets had in the input SPE payloads received by ITD 22. Therefore, it may also be necessary for the frame mapper to recalculate the error coverage indication (the B3 byte in the TOH of SONET frames) in the frames that it generates. ITD 24 transmits the regenerated frames via TDM interface 60.

Figure 4A:
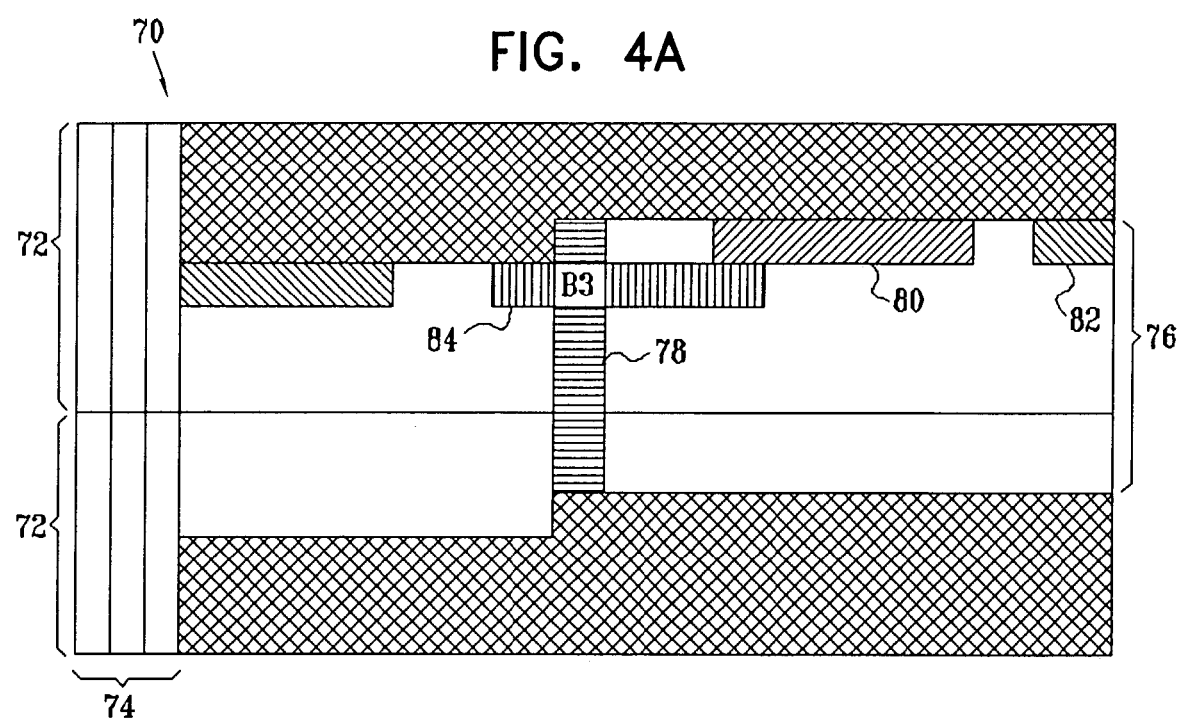
FIG. 4A is a block diagram that schematically illustrates frames of input data received by an integrated data transport network.

FIG. 4A is a block diagram that schematically illustrates an input sequence 70 of SONET frames 72 carrying packet data. Sequence 70 is an example of the type of signals that is received by TDM interface 42 in ITD 22 (FIG. 2). In accordance with SONET standards, frames 72 comprise three columns of transport overhead (TOH) 74, followed by eighty-seven columns of payload. The payload contains a sequence of SPEs 76. Each SPE begins with one column of path overhead (POH) 78, which includes the above-mentioned B3 byte. As shown in the figure, the SPE is typically not aligned with the frame boundaries and can start at any byte in the payload. SPE 76 in the present example comprises three data packets 80, 82 and 84. The blank spaces between and following packets 80, 82 and 84 represent idle bytes that fill the gaps in SPE 76 between the data packets when the packet traffic carried by the SONET input signal is sparse.

As described above, TDM interface 42 passes SPE 76 to packet data encapsulation module 46, which packetizes and encapsulates the SPE contents. (If the SPE is scrambled, as dictated by some communication standards, such as HDLC, module 46 typically de-scrambles the SPE before encapsulation.) Preferably, module 46 encapsulates the data in packets 80, 82 and 84, while discarding most or all of the idle bytes in the SPE. Each packet 80, 82 and 84 may be encapsulated individually, or two or more of the packets may be encapsulated in a single packet for transmission over network 28. When the packets to be encapsulated are short, network bandwidth can be conserved by encapsulating several input packets together, since in this case the encapsulation overhead is incurred only once, rather than repeatedly for every individual input packet.

Figure 4B:
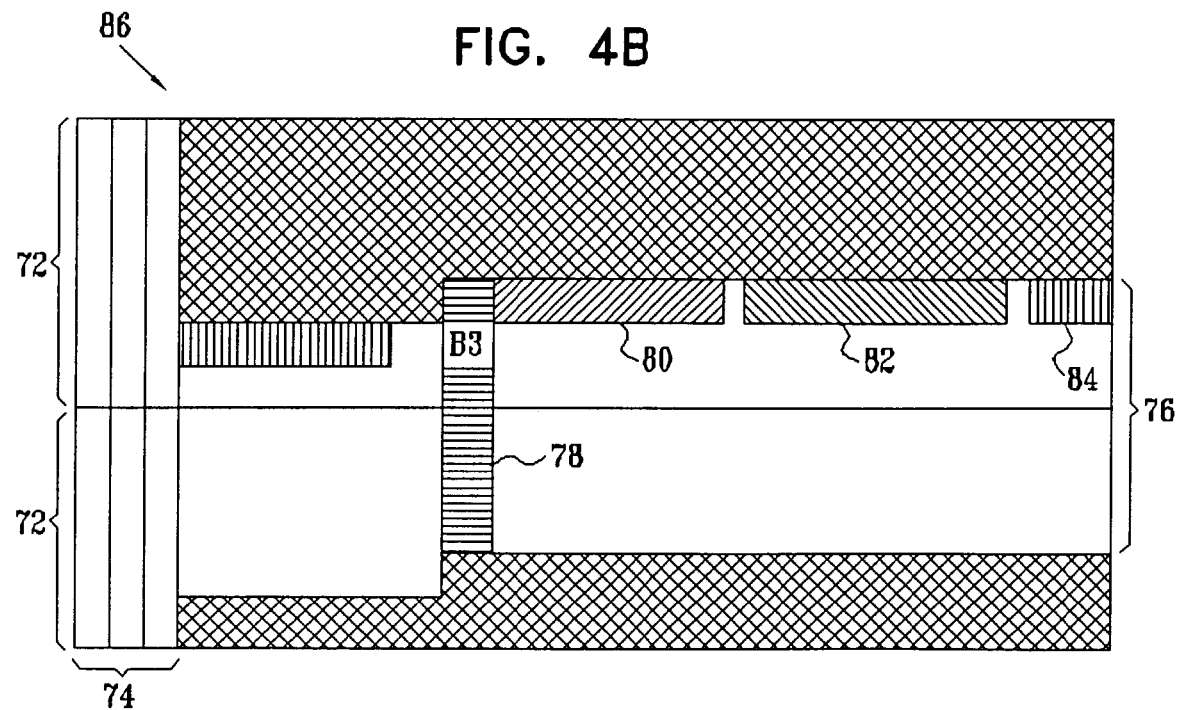
FIG. 4B is a block diagram that schematically illustrates frames of output data generated by an integrated data transport network, based on the input data of FIG. 4A, in accordance with an embodiment of the present invention.

FIG. 4B is a block diagram that schematically illustrates an output sequence 86 of SONET frames 72 that are output by TDM interface 60 of ITD 24, in accordance with an embodiment of the present invention. Packet de-encapsulation module 62 extracts packets 80, 82 and 84 from the packet or packets in which they were transported over network 28. Because the idle bytes between the packets were removed at ITD 22, and are not reinserted at ITD 24, the locations of packets 80, 82 and 84 in the SPE are shifted relative to their original locations. Since packets 80, 82 and 84 do not contain synchronous data, the shift in their positions will have no effect on the users who will eventually receive the packets. Typically, module 62 adds idle bytes after packet 84, if necessary, to make up the full complement of 783 payload bytes in the SPE.

After reinserting packets 80, 82 and 84 in SPE 76, mapper 68 recomputes the B3 byte based on the new packet locations, and re-scrambles the SPE if necessary. As shown in the figure, SPE 76 may also be shifted relative to SONET frames 72, by comparison with its position in input sequence 70.

Figure 5:
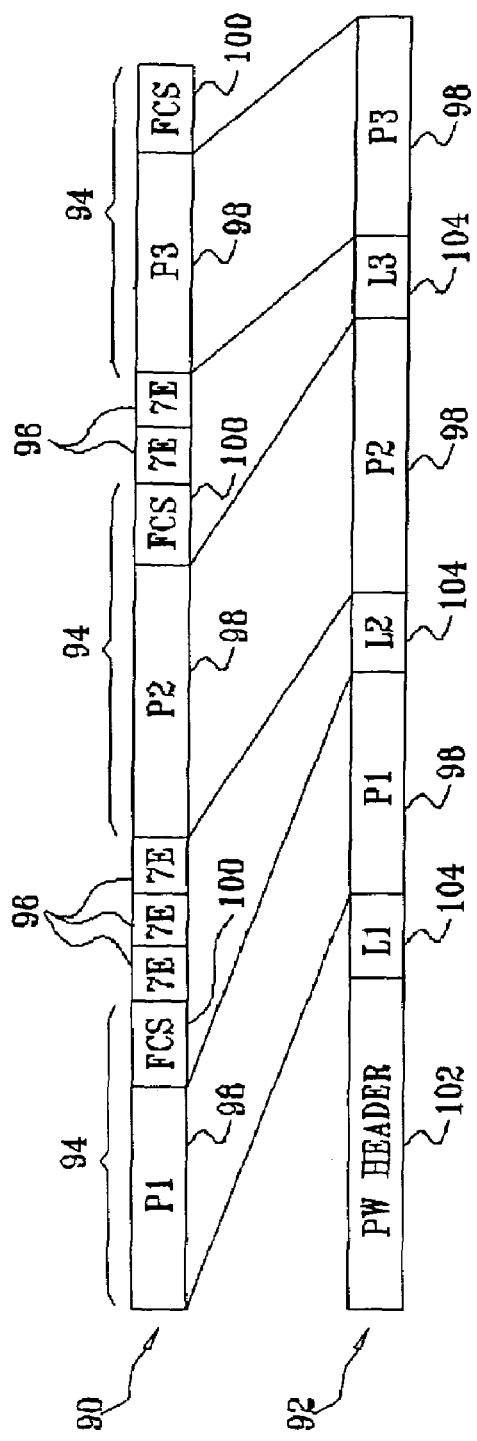
FIGS. 5 and 6 are block diagrams that schematically illustrate a stream of data packets before and after suppression of idle bytes in the stream, in accordance with an embodiment of the present invention.

FIG. 5 is a block diagram that schematically illustrates another method for suppressing idle bytes in an input stream 90 of packets 94, in accordance with an embodiment of the present invention. Each of packets 94 comprises packet data 98 (including both header and payload), followed by a frame check sequence (FCS) 100, as is known in the art. Packets 94 are separated by an arbitrary number of inter-frame (idle) bytes 96, for example, 0x7E bytes, as provided in HDLC.

Module 46 encapsulates input packets 94 into a single encapsulating output packet 92, while removing FCS 100 and all idle bytes 96. Packet 92 begins with a PW header 102, which includes labels to be used in transporting and processing the packet. The labels in header 102 may be generally similar to those specified by Martini et al., for example, with changes as needed to support encapsulation of multiple input packets 84 in a single output packet 92. Packet data 98 of packets 94 are concatenated in packet 92 with length fields 104, each of which indicates the length (in bytes) of the packet data that follow it. Module 46 may continue to concatenate packets 94 into packet 92 until the encapsulating packet reaches some maximum length, or until a time limit has elapsed or a certain number of bytes has been processed (such as the duration of a SONET frame—125 μs—or the contents of a SPE payload—783 bytes). Based on header 102 and length fields 104, module 62 extracts packet data 98 from packet 92. It then reconstructs packets 94 by recomputing FCS 100 for each packet and adding inter-frame bytes 96 between successive packets. Mapper 68 inserts the reconstructed packets into the SPE of the outgoing TDM signal.

Figure 6:
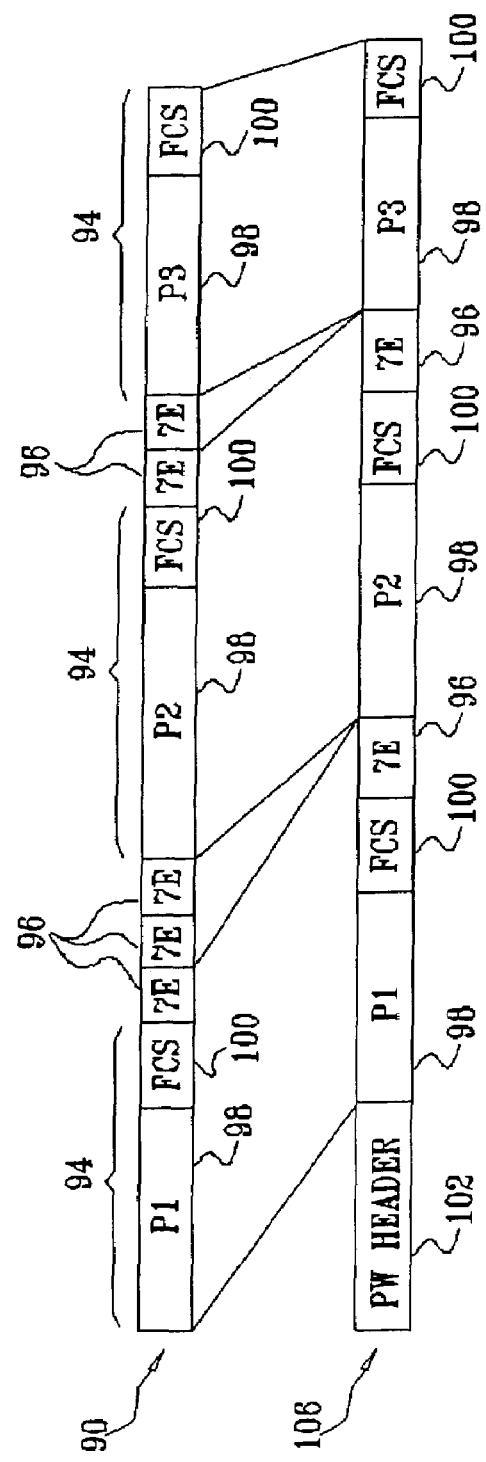

FIG. 6 is a block diagram that schematically illustrates another method for suppressing idle bytes in input stream 90, in accordance with an alternative embodiment of the present invention. In this case, module 46 simply identifies occurrences of multiple, sequential idle bytes 96, and removes all but one of them at each occurrence. This approach does not compress the input stream quite as effectively as the method of FIG. 5, but it has the advantage of simplifying the implementation of de-encapsulation module 62. All that is required of module 62 in this case is to read and remove PW header 102, and then to transfer the entire payload of an encapsulating output packet 106 to frame mapper 68. There is no need for module 62 to recompute FCS 100 or to insert any inter-frame bytes between packets 94.

Figure 7:
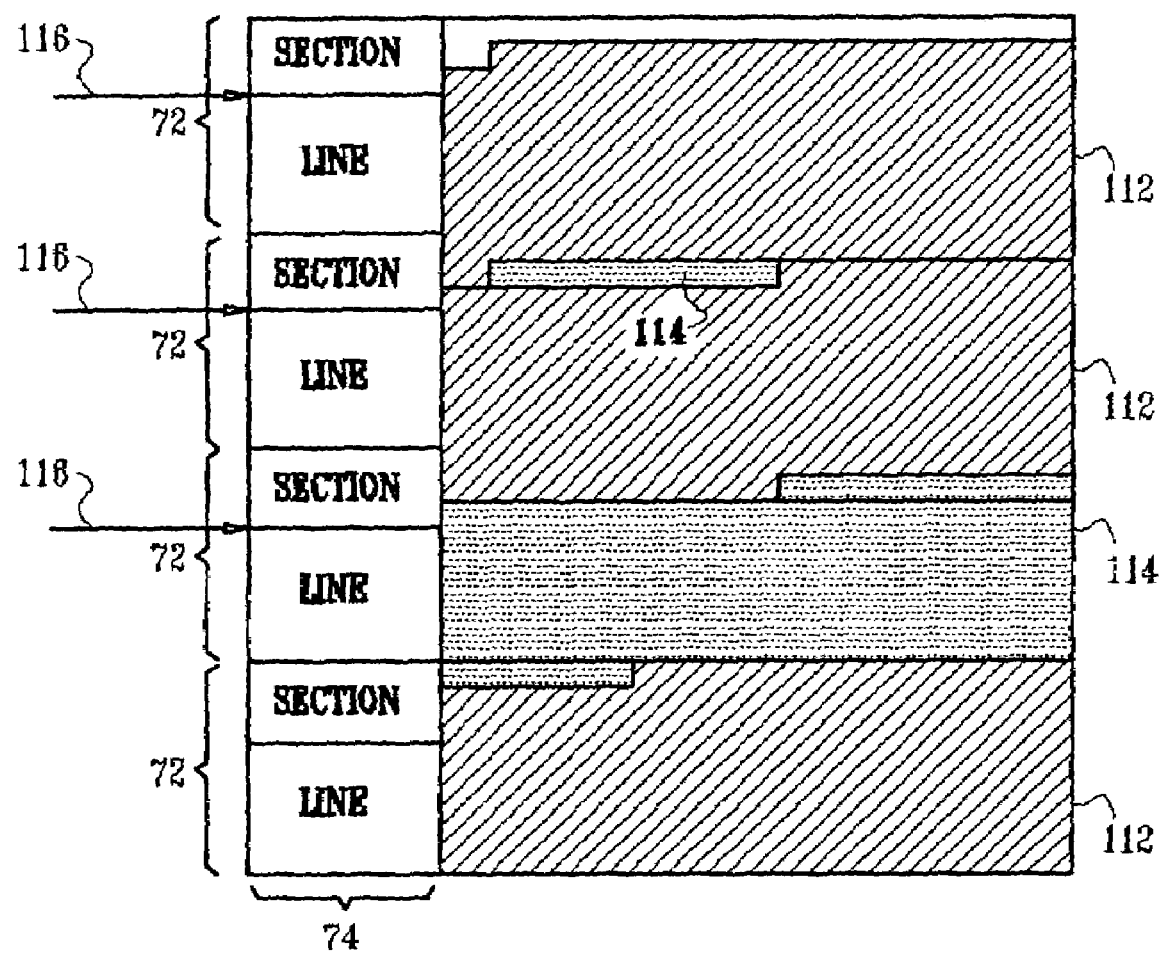
FIG. 7 is a block diagram that schematically illustrates a sequence of data frames separated by idle bytes.
Figure 8:
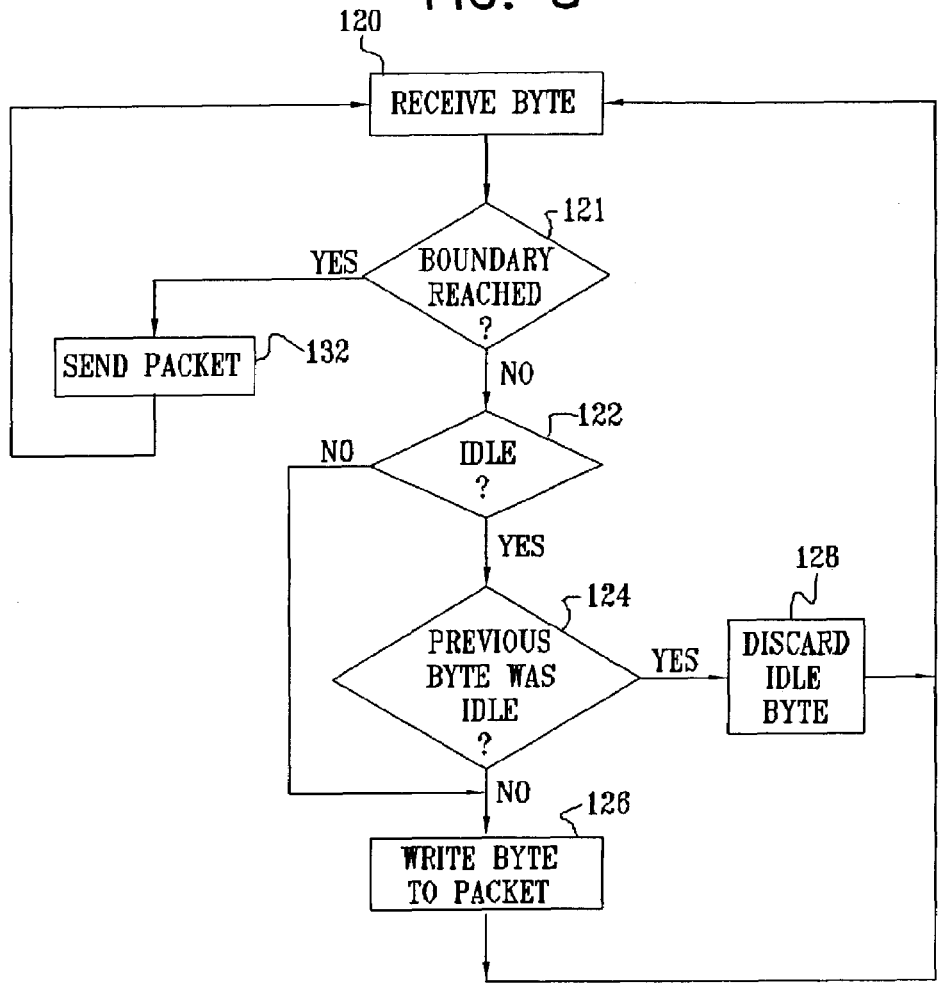
FIG. 8 is a flow chart that schematically illustrates a method for encapsulating data while suppressing idle bytes, in accordance with an embodiment of the present invention.

Reference is now made to FIGS. 7 and 8, which schematically illustrate a method for suppressing idle bytes in encapsulated SONET frame payloads transmitted over network 28, in accordance with another embodiment of the present invention. This method is generally compatible with the packet format specified by Malis et al., but reduces the volume of data that must be transmitted over network 28 when the TDM signal contains idle intervals. The method is applicable to data streams that comprise, inter alia, either HDLC frames or ATM cells.

FIG. 7 is a block diagram that shows a sequence 110 of SONET frames 72 containing HDLC frames 112. The HDLC frames are separated by idle bytes 114 when the SONET SPE has no valid data to transmit. A sequence of boundary points 116 is defined in the SONET signal stream, which are used in determining when module 46 should close and transmit each successive packet in the method of FIG. 8, as described below. The spacing of the boundary points determines the maximum size of the encapsulating packets generated by module 46. It is convenient (and compatible with Malis et al.) for boundary points 116 to be synchronized with the SONET stream, for example, at the H1 byte of each successive STS-1 frame 72 in TOH 74. In this case, the SONET signal provides 783 bytes of payload data between successive boundary points. Alternatively, the boundary points may be spaced closer or further apart.

FIG. 8 is a flow chart that schematically illustrates a method for encapsulating the payload data of HDLC frames 112. Module 46 receives successive payload bytes from the SONET input data stream, at a byte input step 120. For this purpose, each SONET STS frame sequence is treated as a separate source of data, as noted above. For each byte that it receives from a given STS source, module 46 checks to determine whether it has reached the next boundary point 116 in the SONET signal, at a boundary checking step 121. As long as it has not yet reached the boundary, the module checks each byte to determine whether it is an idle byte (7E), at an idle checking step 122. Upon receiving an idle byte, module 46 determines whether the preceding byte was also an idle byte, at an idle state checking step 124. If so, the current byte is discarded, at a discard step 128. Otherwise, the current byte is written to the current output packet, at a data writing step 126. The effect of this operation is to discard all of idle bytes 114 between data frames 112, except for a single remaining inter-frame byte.

When module 46 reaches boundary point 116 at step 121, it passes the current packet on to multiplexer 50 for transmission, at a packet transmission step 132. The result is that ITD 22 sends a stream of packets of variable length, up to a maximum of 783 payload bytes, which are synchronized with the STS source of the data.

Figure 9:
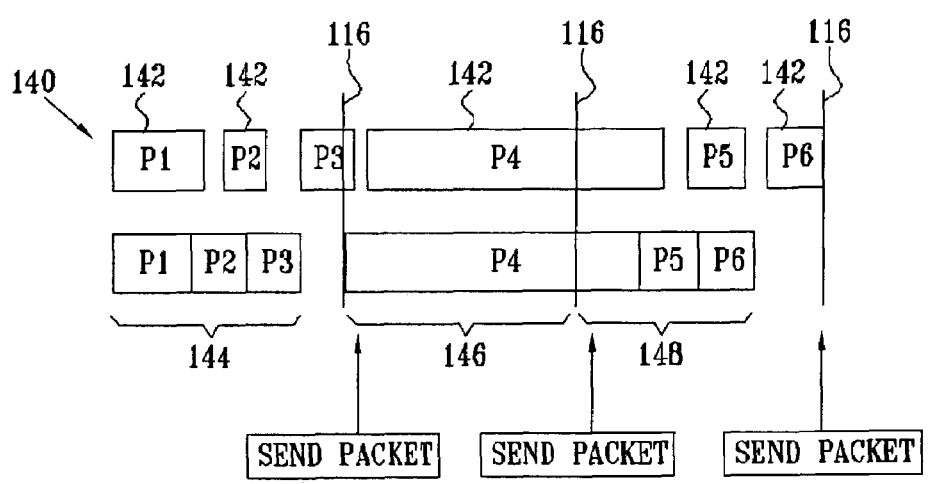
FIG. 9 is a block diagram that schematically illustrates encapsulation of a stream of data packets, in accordance with an embodiment of the present invention.

FIG. 9 is a block diagram that schematically illustrates another, related method for encapsulating TDM data while suppressing idle bytes, in accordance with an embodiment of the present invention. An input data stream 140 comprises a succession of input packets 142, separated by idle bytes (as indicated by blank spaces between the packets). Boundary points 116 are indicated at fixed intervals, typically once per SONET frame. The number of payload bytes carried by stream 140 in the interval between successive boundary points is referred to as "max_length". When the boundary points are aligned with SONET frames, max_length=783 bytes, but larger or smaller values of max_length may alternatively be used, up to the maximum payload size permitted on packet network 28.

To encapsulate the data in stream 140, packet data encapsulation module 46 de-scrambles packets 142, if necessary, and then concatenated the packets into output packets 144, 146, 148, . . . . A single inter-frame byte (such as 7E) is typically left between the end of each packet 142 and the beginning of the next one, but all the remaining idle bytes are dropped. Module 46 buffers packets 142 until it reaches the next boundary point 116. At this point, if the buffer contains the full max_length bytes, or if the next input byte in data stream 140 is an idle byte, module 46 closes and sends the next output packet to multiplexer 50.

If encapsulation module 46 reaches the boundary point, however, without having filled the buffer, and the next input byte is not an idle byte, the module defers sending the next output packet until either (1) the buffer is filled with max_length bytes or (2) the next byte in the input stream is an idle byte, whichever occurs first. Packet P3 in stream 140 exemplifies case (2). In this case, at the first boundary 116 in FIG. 9, module 46 is still receiving P3, and the buffer for the next output packet 144 is not yet full, since idle bytes following packets P1 and P2 have been dropped. Packet 144 is therefore sent to multiplexer 50 only at the conclusion of P3 in stream 140.

Packet P4 exemplifies case (1). In this case, at the second boundary point 116 in FIG. 9, module 46 is still receiving P4, but P4 itself contains more than max_length bytes. Therefore, module 46 closes and sends out packet 146 once it has received max_length bytes of P4, shortly after the second boundary point. The remainder of P4 is inserted in packet 148, which is sent by module 46 at the third boundary point 116, at the conclusion of packet P6 in stream 140.

Thus, as long as module 46 is receiving non-idle input data, it generates an output packet once for each boundary point 116 in the input stream. The output packets are approximately synchronized with the boundary points, but may not be exactly synchronized. This arrangement is useful in maximizing the volume of payload data transmitted over network 28, relative to the amount of overhead that must be transmitted, while still keeping rough synchronization with the TDM input and output signals to and from ITDs 22 and 24.

Figure 10:
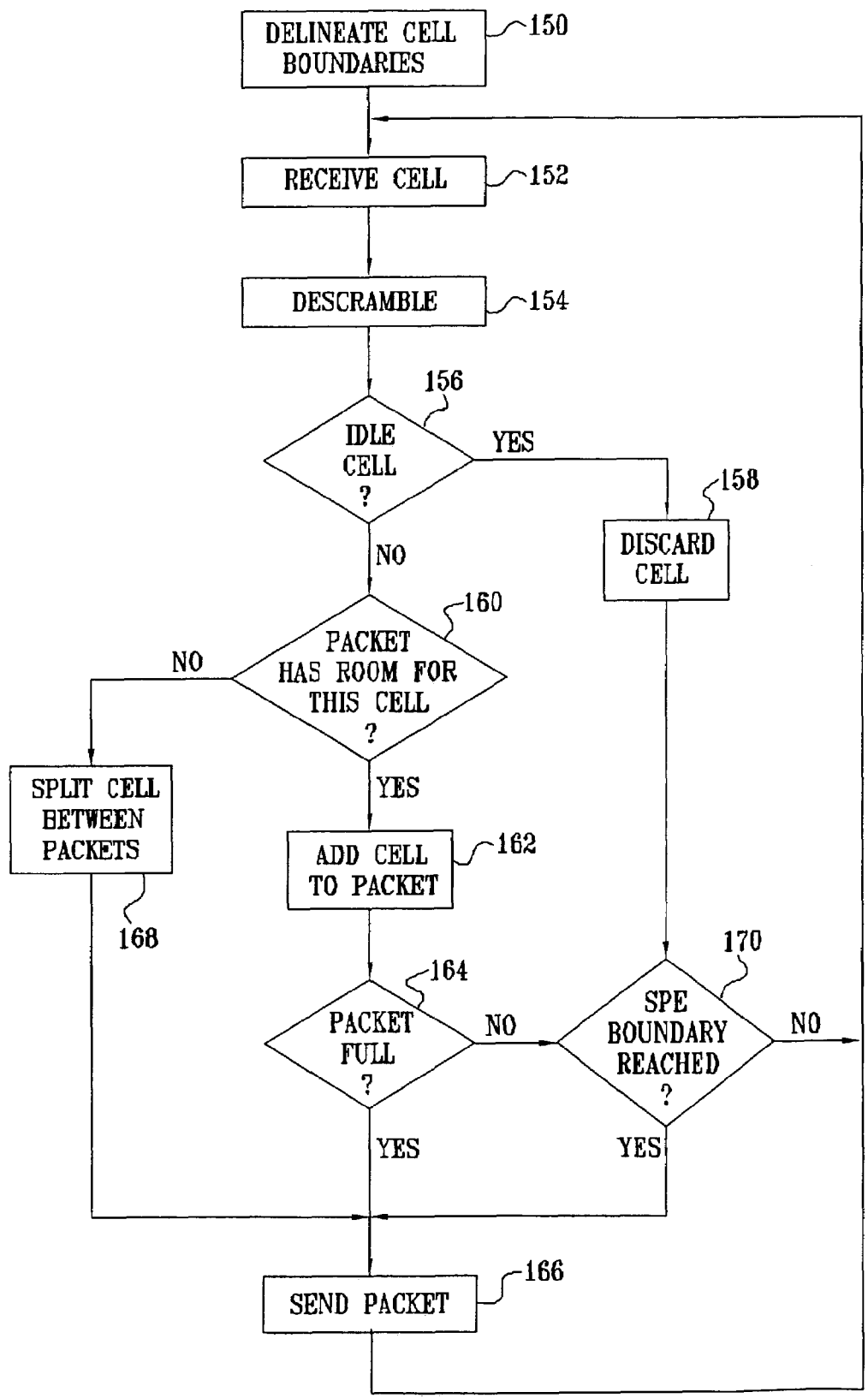
FIG. 10 is a flow chart that schematically illustrates a method for encapsulating data cells while suppressing idle cells, in accordance with an embodiment of the present invention.

FIG. 10 is a flow chart that schematically illustrates a method applied by encapsulation module 46 to encapsulate TDM payloads that contain ATM cells, in accordance with an embodiment of the present invention. In ATM communications, when a transmitter has no data or OAM (Operation, Administration and Maintenance) cells to send, it transmits complete idle cells, rather than just idle bytes, as in the examples given above. Therefore, in order to encapsulate an ATM stream carried by a TDM signal, module 46 first synchronizes on the cell headers, at a cell synchronization step 150. This sort of synchronization, referred to as cell delineation, is well known in the ATM art, and is a function of standard ATM adaptation layers.

Once the cell boundaries are known, module 46 receives and processes successive cells, at a cell reception step 152. Each cell is de-scrambled, at a de-scrambling step 154. Module 46 then examines the contents of each cell, to determine whether it is an idle cell or a data-carrying or OAM cell, at an idle detection step 156. Idle cells are simply discarded, at a cell discard step 158. If the current cell is a data or OAM cell, module 46 checks its buffer to ascertain whether there is room to insert the cell in the next output packet, at a buffer checking step 160. (As in the preceding examples, the size of the buffer is determined by the maximum payload size, max_length, of packets to be transmitted over network 28. Typically, although not necessarily, max_length is equal to the SPE size, 783 bytes.) If there is room in the buffer, the current cell is added to the next output packet, at a cell addition step 162. After adding the new cell to the buffer, module 46 checks to determine whether the buffer now contains the full complement of max_length bytes of data, at a packet completion step 164. If so, the current output packet is passed to multiplexer 50 for transmission over network 28, at a packet transmission step 166.

Alternatively, module 46 may determine at step 160 that although its buffer is not yet full, there is not enough space remaining in the buffer to accommodate all of the current cell. In this case, the cell is split, at a cell splitting step 168. The first portion of the split cell (filling up the buffer to max_length) goes into the current output packet, while the second portion is held over to the beginning of the next output packet. The current output packet is then transmitted at step 166.

To maintain compatibility in this embodiment with the encapsulation scheme defined by Malis et al., as described above, ITD 22 should generate an output packet for transmission over network 28 once per SPE. If the current SPE contained any idle cells, however, module 46 may reach the SPE boundary before filling the buffer. Therefore, after processing each input cell, module 46 checks to determine whether it has reached the next boundary point, at a boundary checking step 170. If so, module 46 passes the output packet immediately to multiplexer 50 at step 166 without waiting to fill the buffer.

De-encapsulation module 62 receives the encapsulating packets and processes them to generate output SPEs in substantially the manner described above. When the payload size of an encapsulating packet is less than 783 bytes, module 62 adds idle cells to complete the SPE. If an idle cell crosses a boundary at the end of one output SPE, it may cause the positions of the data cells in the next SPE to be shifted. This shift, however, has no effect on the underlying stream of data that is carried by the ATM cells. Module 62 re-scrambles each ATM cell, and mapper 68 calculates the new value of the B3 byte, as described above.

Alternatively, encapsulation module 46 may skip de-scrambling step 154. In this case, to prevent loss of data at the boundaries of idle cells in the TDM input stream to ITD 22, module 46 does not drop the idle cells immediately preceding each sequence of data cells. Thus, an idle cell is dropped only if the succeeding cell is also an idle cell. In other respects, modules 46 and 62 operate substantially as described above. Of course, there is no need in this case for de-encapsulation module 62 to re-scramble the cells.

The methods and devices described herein for encapsulating packet data (while suppressing idle data) may be used in conjunction with other methods of compression for reducing still further the volume of data transmitted over network 28. For example, when SONET input signals received by ITD 22 from TDM source 30 (FIG. 1) include Virtual Tributaries (VTs), ITD 22 may apply methods of VT compression to suppress unused VTs. Methods of VT compression that can be used for this purpose are described in the above-mentioned Internet draft by Pate et al., as well as in U.S. patent application Ser. No. 09/978,342, filed Oct. 17, 2001, which is assigned to the assignee of the present patent application, and whose disclosure is incorporated herein by reference. Additionally or alternatively, ITD 22 may apply a C2-based compression scheme, as described by Cohen in the above-mentioned PCT Patent Publication WO 02/095958 A2.

Although the methods of data encapsulation described above relate specifically to encapsulation of data contained in the SPE of a SONET signal, the principles of the present invention may similarly be applied to SDH signals, as well as to circuit-switched signals of other types. In the context of the present patent application and in the claims, such signals are referred to generically as TDM signals. Furthermore, although embodiments of the present invention are described above with reference to certain specific protocols and conventions for packet data communications, encapsulation and circuit emulation, the methods and devices provided by the present invention may be adapted to operate under protocols and conventions of other types, as are known in the art or as may be defined in the future.

FIG. 11, for example, is a block diagram showing details of ITD 22 as applied to encapsulating PDH signals, in accordance with another embodiment of the present invention. The elements of this embodiment may be combined in a single ITD with the embodiments described above, so that the ITD encapsulates and transports both SONET/SDH and PDH signals. Alternatively, the embodiment shown here may be used in a stand-alone configuration, to receive and process PDH inputs only, as shown in the figure. Packet interface 40, as described above, may also be incorporated in such stand-alone and combined embodiments, but it is omitted from FIG. 11 for the sake of simplicity.

In the present embodiment, TDM interface 42 comprises a DS-3 interface 180 and a DS-1 (and/or E1) interface 182. Details of the DS-1 and DS-3 signals are defined in ANSI specification T1.404-1994, entitled "Network to Customer Installation—DS3 Metallic Interface" (1994), which is incorporated herein by reference. Alternatively, the DS3 and DS1 signals may be conveyed to interfaces 180 and 182 inside SONET or SDH structured signals, as described in the Background of the Invention. In this case, interfaces 180 and 182 first recover the DS3, DS1 and/or E1 signals from the SONET or SDH frames, and then proceed with the method described hereinbelow. In any case, the DS-1 and DS-3 signals may carry either synchronous or non-synchronous (packet) data.

The DS-3 signals may be configured to carry data packets (including ATM cells) in either a structured or an unstructured mode. In the unstructured mode, the full available payload (44.210 Mbps) of the DS-3 signal is used to transport the packets. In this mode, the packets are simply mapped consecutively to the DS-3 payload. When the data traffic is sparse, idle bytes or cells may be mapped between the packets in the DS-3 payload, as they are in the case of SONET payloads described above. In the structured (or channelized) mode, the DS-3 payload carries multiple lower-rate signals, for example, twenty-eight DS-1 signals. In this case, the packets are mapped to the individual DS-1 signals.

When using DS-1 signals to carry packets, a number of different mapping schemes may be used. In one scheme, the DS-1 signal carries a single stream of packets, which are simply mapped consecutively over the available twenty-four bytes of successive DS-1 payload frames. As in the case of unstructured DS-3 mapping, some of the DS-1 frames may contain idle bytes or cells. Alternatively, fractional mapping may be used, in which each DS-1 frame is divided into two or more slots, each comprising a different, fixed subset of the bytes in each frame. Multiple packet streams may be mapped to different slots. For example, one packet stream may be mapped to the first sixteen bytes of each DS-1 frame, while another packet stream is mapped to the last eight bytes. Whenever a slot (or a part of a slot) in a given DS-1 frame is unused, it is filled with idle bytes. E1 frames, comprising thirty-two bytes each, may similarly be used to carry packets either by consecutive or fractional mapping.

Interfaces 180 and 182 identify the payload data they receive as either synchronous or non-synchronous data, in the manner described above. When the payload data are non-synchronous, they are typically conveyed to packet data encapsulation module 46. In structured-mode DS-3 signals, module 46 treats each component lower-rate signal as a separate data source for purposes of extraction and encapsulation of the packet data. Similarly, each slot in a fractionally-mapped DS-1 or E1 signal is treated as a separate data source. In the course of encapsulating the input packets in the payload data, module 46 removes idle bytes or cells, using the methods described above for removing idle bytes or cells from SONET SPEs, *mutatis mutandis*. The data are then encapsulated and transmitted over network 28 to egress ITD 24, which reconstructs the PDH data streams, while re-inserting idle bytes or cells where required. Overhead information is likewise encapsulated by module 48 and is transmitted to and used by ITD 24 in the manner described above.

When DS-3 interface 180 receives a structured signal carrying a synchronous data payload, it passes the data to a structured VT encapsulation module 184. This module maps the components of the payload to virtual tributaries (VTs) of a STS-1 SONET frame. VT configurations that can be used for this purpose are described in the Background of the Invention. In order to conserve bandwidth on network 28, module 184 suppresses unused VTs, using the methods described in the above-mentioned Internet draft by Pate et al., or in U.S. patent application Ser. No. 09/978,342, for example. A CE frame encapsulation module 188 completes the encapsulation of the payload data in output packets, in such a way as to preserve synchronization of the data sent to egress ITD 24. Module 188 adds transport headers to the output packets, typically as specified by Malis et al.

When interface 182 receives DS-1 or E1 signals carrying synchronous payload data, it passes the payload data to an unstructured VT encapsulation module 186. This module maps the DS-1 or E1 signals into VT1.5 or VT2 containers, respectively. It likewise maps unstructured DS-3 signals into STS-1 frames. (Equivalently, in emulation of SDH networks, module 186 may map DS-1, E1 and DS-3 signals into VC-1, VC-2 and VC-3 containers, respectively.) Module 186 may map these containers or frames directly into output packets for transmission over network 28, typically as specified by Pate et al. Alternatively, the VT (or VC) containers may be passed to CE frame encapsulation module 188, which maps the containers into full STS-1 frames and encapsulates the frames in output packets, typically as specified by Malis et al. In either case, the output packets are then transmitted via multiplexer 50 over network 28.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for data communications, comprising:
   receiving a time-division-multiplexed (TDM) input signal carrying a payload comprising data;
   determining whether the data comprise synchronous or non-synchronous data;
   selecting a first encapsulation scheme if the data comprise synchronous data, and a second encapsulation scheme if the data comprise non-synchronous data; and
   encapsulating the data for transmission over a packet-switched network in accordance with the selected encapsulation scheme,
   encapsulating the data in accordance with said second encapsulation scheme comprising:
   detecting idle data in the payload carried by the TDM input signal; and
   generating output packets to encapsulate the data while omitting from the output packets at least some of the idle data,
   said generating the output packets comprising joining together at least first and second information-carrying sequences of the data from the TDM input signal so as to generate one of the output packets while eliminating all but a single unit of the idle data intervening between the first and second information-carrying sequences in the TDM input signal.

2. A method for data communications, comprising:
   receiving a time-division-multiplexed (TDM) input signal carrying a payload comprising data;
   determining whether the data comprise synchronous or non-synchronous data;
   selecting a first encapsulation scheme if the data comprise synchronous data, and a second encapsulation scheme if the data comprise non-synchronous data;
   encapsulating the data for transmission over a packet-switched network in accordance with the selected encapsulation scheme;
   transmitting the output packets over the network to a receiver; and
   at the receiver, mapping the data carried by each of the output packets to an output frame, for transmission in a TDM output signal,
   encapsulating the data in accordance with the second encapsulation scheme comprising:
   detecting idle data in the payload carried by the TDM input signal; and
   generating output packets to encapsulate the data while omitting from the output packets at least some of the idle data,
   said mapping the data comprising, when the data carried in one of the output packets is shorter than a length of the output frame, adding further idle data to the output frame following the data carried in the one of the output packets so as to complete the output frame.

3. A The method for data communications, comprising:
   receiving time-division-multiplexed (TDM) input signals from a TDM source in a circuit-switched network, said TDM input signals comprising first input frames carrying a first payload comprising synchronous data and second input frames carrying a second payload comprising non-synchronous data;
   encapsulating the synchronous and non-synchronous data in output packets having respective first and second service levels;
   receiving a non-synchronous input signal comprising input packets from a packet source outside the circuit-switched network;
   encapsulating the input packets in the output packets for transmission over the packet-switched network at the second service level;
   transmitting the output packets over a packet-switched network to a receiver, such that the packets at the first service level are transmitted over the packet-switched network with a higher priority than the packets at the second service level; and
   at the receiver, mapping the data to output frames, for transmission in one or more TDM output signals, so as to provide a circuit emulation service.

4. A method for data communications, comprising:
   receiving time-division-multiplexed (TDM) input signals comprising first input frames carrying a first payload comprising synchronous data and second input frames carrying a second payload comprising non-synchronous data;
   encapsulating the synchronous and non-synchronous data in output packets having respective first and second service levels, said encapsulating the non-synchronous data comprising:
   detecting idle data in the second input frames; and
   generating the output packets to encapsulate the non-synchronous data while omitting from the output packets at least some of the idle data;
   transmitting the output packets over a packet-switched network to a receiver, such that the packets at the first service level are transmitted over the packet-switched network with a higher priority than the packets at the second service level; and
   at the receiver, mapping the data to output frames, for transmission in one or more TDM output signals, so as to provide a circuit emulation service.

5. The method according to claim 4, wherein said mapping the data comprises adding further idle data to at least some of the output frames following the non-synchronous data so as to complete the output frames.

6. Apparatus for data communications, comprising:
   a time-division-multiplexed (TDM input interface, which is adapted to receive a TDM input signal from a TDM source in a circuit-switched network, said TDM input signal carrying a payload comprising synchronous or non-synchronous data;
   a packet interface, which is adapted to receive a non-synchronous input signal comprising input packets from a packet source outside the circuit-switched network; and
   processing circuitry, which is adapted to select a first encapsulation scheme if the data comprise synchronous data, and a second encapsulation scheme if the data comprise non-synchronous data, and to encapsulate the data for transmission over a packet-switched network in accordance with the selected encapsulation scheme,
   the processing circuitry also being adapted to apply the second encapsulation scheme to encapsulate the input packets in output packets for transmission over the packet-switched network.

7. Apparatus for data communications, comprising:
   an input interface, which is adapted to receive a time-division-multiplexed (TDM) input signal carrying a payload comprising synchronous or non-synchronous data; and
   processing circuitry, which is adapted to select a first encapsulation scheme if the data comprise synchronous data, and a second encapsulation scheme if the data comprise non-synchronous data, and to encapsulate the data for transmission over a packet-switched network in accordance with the selected encapsulation scheme, the processing circuitry being adapted:

in accordance with the second encapsulation scheme, to detect idle data in the payload carried by the TDM input signal, and to generate output packets encapsulating the data while omitting from the output packets at least some of the idle data; and to join together at least first and second information-carrying sequences of the data from the TDM input signal so as to generate one of the output packets while eliminating all but a single unit of the idle data intervening between the first and second information-carrying sequences in the TDM input signal.

8. Apparatus for data communications, comprising:

an input interface, which is adapted to receive a time-division-multiplexed (TDM) input signal carrying a payload comprising synchronous or non-synchronous data;

processing circuitry, which is adapted to select a first encapsulation scheme if the data comprise synchronous data, and a second encapsulation scheme if the data comprise non-synchronous data, and to encapsulate the data for transmission over a packet-switched network in accordance with the selected encapsulation scheme, the processing circuitry also being adapted in accordance with the second encapsulation scheme, to detect idle data in the payload carried by the TDM input signal, and to generate output packets encapsulating the data while omitting from the output packets at least some of the idle data;

a network interface, which is adapted to transmit the output packets over the network; and a receiver, which is adapted to receive the output packets from the network and to map the data carried by each of the output packets to an output frame, for transmission in a TDM output signal, the receiver being adapted, when the data carried in one of the output packets is shorter than a length of the output frame, to add further idle data to the output frame following the data carried in the one of the output packets so as to complete the output frame.

9. Apparatus for data communications, comprising:

a packet data transmitter, which comprises:

an input interface comprising a time-division-multiplexed (TDM) interface, which is adapted to receive TDM input signals from a TDM source in a circuit-switched network, said TDM input signals comprising first input frames carrying a first payload comprising synchronous data and second input frames carrying a second payload comprising non-synchronous data, and a non-packet interface, which is adapted to receive a non-synchronous input signal comprising input packets from a packet source outside the circuit switched network;

processing circuitry, which is adapted to encapsulate the synchronous and non-synchronous data in output packets having respective first and second service levels and to encapsulate the input packets in the output packets for transmission over the packet-switched network at the second service level; and an output interface, which is adapted to transmit the output packets over a packet-switched network, such that the packets at the first service level are transmitted over the packet-switched network with a higher priority than the packets at the second service level; and a receiver, which is adapted to receive the output packets from the packet-switched network, and to map the data in the output packets to output frames, for transmission in one or more TDM output signals, so as to provide a circuit emulation service.

10. Apparatus for data communications, comprising:

a packet data transmitter, which comprises:

an input interface, which is adapted to receive time-division-multiplexed (TDM) input signals comprising first input frames carrying a first payload comprising synchronous data and second input frames carrying a second payload comprising non-synchronous data;

processing circuitry, which is adapted to encapsulate the synchronous and non-synchronous data in output packets having respective first and second service levels, the processing circuitry also being adapted to detect idle data in the second input frames, and to generate the output packets so as to encapsulate the non-synchronous data while omitting from the output packets at least some of the idle data; and an output interface, which is adapted to transmit the output packets over a packet-switched network, such that the packets at the first service level are transmitted over the packet-switched network with a higher priority than the packets at the second service level; and a receiver, which is adapted to receive the output packets from the packet-switched network, and to map the data in the output packets to output frames, for transmission in one or more TDM output signals, so as to provide a circuit emulation service.

11. Apparatus for data communications, comprising:

a packet data transmitter, which comprises:

an input interface, which is adapted to receive time-division-multiplexed (TDM) input signals comprising first input frames carrying a first payload comprising synchronous data and second input frames carrying a second payload comprising non-synchronous data;

processing circuitry, which is adapted to encapsulate the synchronous and non-synchronous data in output packets having respective first and second service levels; and an output interface, which is adapted to transmit the output packets over a packet-switched network, such that the packets at the first service level are transmitted over the packet-switched network with a higher priority than the packets at the second service level; and a receiver, which is adapted to receive the output packets from the packet-switched network, and to map the data in the output packets to output frames, for transmission in one or more TDM output signals, so as to provide a circuit emulation service, the receiver also being adapted to add further idle data to at least some of the output frames following the non-synchronous data so as to complete the output frames.

* * * * *